United States Patent [19]

Thrailkill

[11] Patent Number: 5,407,564
[45] Date of Patent: Apr. 18, 1995

[54] CLOSED LOOP LIQUID TREATMENT AND RECYCLING SYSTEM

[75] Inventor: Donald B. Thrailkill, Houston, Tex.

[73] Assignee: Turf Industries, Inc., Houston, Tex.

[21] Appl. No.: 8,376

[22] Filed: Jan. 25, 1993

[51] Int. Cl.⁶ .............................................. C02F 3/02
[52] U.S. Cl. .............................. 210/167; 210/195.1; 210/202; 210/256; 210/301
[58] Field of Search ...................... 210/195.1, 194, 201, 210/202, 256, 295, 300, 301, 622, 167

[56] References Cited

U.S. PATENT DOCUMENTS

| | | | |
|---|---|---|---|
| 3,306,447 | 2/1967 | Medeiros | 210/202 |
| 3,412,864 | 11/1968 | Okada | 210/202 |
| 3,419,146 | 12/1968 | Koulovatos | 210/295 |
| 3,440,669 | 4/1969 | Boester | 210/622 |
| 3,770,624 | 11/1973 | McKilben et al. | 210/622 |
| 4,021,347 | 5/1977 | Teller et al. | 210/195.1 |
| 4,070,292 | 1/1978 | Adams | 210/195.1 |
| 4,608,157 | 8/1986 | Graves | 210/202 |
| 4,933,076 | 6/1990 | Oshima et al. | 210/195.1 |
| 5,156,742 | 10/1992 | Struewing | 210/195.1 |

*Primary Examiner*—Christopher Upton
*Attorney, Agent, or Firm*—Robert C. Curfiss; Butler & Binion

[57] ABSTRACT

A closed loop liquid treatment system for removing particulate matter and hydrocarbon waste from a contaminated liquid uses passive filtering systems in combination with an active microbe solution to remove particulate matter and to reduce hydrocarbons to fatty acids and carbon dioxide. A plurality of like stages may be employed to enhance the process. The treated liquid may be used in a closed loop system including a work station to which the liquid is recycled.

19 Claims, 2 Drawing Sheets

CLOSED LOOP LIQUID TREATMENT AND RECYCLING SYSTEM

BACKGROUND OF INVENTION

1. Field of Invention

The invention is directed to recycling systems in general and is specifically directed to a closed loop liquid treatment system for removing particulate matter including hydrocarbon waste from a fluid to be recycled.

2. Description of the Prior Art

Waste disposal has become a serious environmental problem. In recent years, the production issues involving the generation and storage of waste has exploded. Further, the impact of waste disposal on the environment has become of increasing concern, particularly in densely populated, industrialized areas. A high percentage of waste generated is organic in nature and contains hydrocarbons.

Many agricultural and industrial operations are dependent upon fluids ranging from solvents to cleansers for maintaining and cleaning mechanical equipment used by way of example, for spreading organic fertilizers, pesticides and the like for pest control and for promoting agricultural growth. Golf courses, for example, are heavy users of machinery used for turf maintenance such as grass cutting and other activities. When the equipment is returned to the storage shed at the end of a workday, proper maintenance requires that the equipment be cleaned. Typically, this is done with water under a high pressure spray to wash off any organic material collecting on the equipment and to rinse any containers used for housing chemical and organic fertilizers and pesticides and the like.

In the past, the waste water generated during such a procedure has been improperly disposed into the environment. With greater environmental concern, this is no longer desirable nor permitted in many areas. Thus, it is required to store the water for disposal at designated waste sites or, in the alternative, to cleanse the water for recycling purposes.

It has long been known to remove the particulate material from such waste water by utilizing mechanical filters and the like. However, this only solves a portion of the problem. The greater risk is the hydrocarbons and other waste materials suspended in the rinse water and not readily subjected to mechanical screening. In addition, by simple mechanically screening the particulate matter from the water, solid waste is quickly generated, creating its own disposal problem.

Naturally occurring microbes, or single cell organisms which are active hydrocarbon consuming organisms naturally occurring in nature, have been utilized in waste control. It has been found that a mixture of living active microbes can be used to bio-degrade organic waste or hydrocarbons suspended in fluids such as water to be cleansed and reclaimed.

Therefore, it is desirable to provide a closed loop water treatment facility on-site wherein the water may be reused over and over again for specific functions, with the waste particles and materials collected in suspension in the water being removed on a cyclic basis and disposed of in a safe manner. Further, it remains desirable to provide equipment wherein the waste may be broken down into the most harmless elements or components while at the same time reducing the accumulation of solid waste generated by such organic components to be disposed of.

SUMMARY OF THE INVENTION

The subject invention provides a method and apparatus for removing hydrocarbon waste from liquids such as fresh or saline water. Utilizing active microbes in combination with passive filtration, the organic residue waste matter can be reduced to a light precipitant as well as the hydrocarbon residue, both suspended and collected in particulate form, may be broken down by the microbes into carbon dioxide and fatty acids. The carbon dioxide may be safely released into the environment, thereby reducing the collected solid waste to fatty acids and greatly reducing the volume of waste accumulated for ultimate disposal.

In its preferred form, the invention utilizes a first stage passive filtration in combination with one or more bio-reactors. Additional treatment systems, such as graphite, baked ceramic porcelains, ultra-violet exposure and the like, may also be used in combination with the passive and active filter systems for sterilization or other treatment, as necessary. The configuration of the overall system is largely dependent upon the waste contaminants contained in the liquid and the concentration of the waste to be removed.

The closed loop system of the subject invention may be a self-contained unit utilizing screen type passive filtration in combination with a bio-reactor charged with isolated microbes or isolates. The invention is equally well-suited for both above ground and in ground installations. In its preferred form, the system uses 3,000 gallon vessel having a 1,000 gallon bio-reactor tank and can recycle up to 160,000 gallons of water a day in a continuous, closed loop system.

By way of example, discharged water containing grass clippings debris, residue or other hydrocarbon waste is introduced into the system collection port.

In an in ground system, this is generally provided by a floor drain at the work station. The water enters the system and then is gravity fed or naturally fed through one or more screens for entrapment of and collection of particulate matter. In the preferred form both the vessel and the bio-reactor tank contain microbes. The fluid is continuously aerated to provide oxygen for enhancing the environment of the microbes to induce them to naturally work in an aerobic manner to breakdown the hydrocarbons, reducing them to fatty acids which gravity drop to the bottom of the vessel and collect as sludge. Carbon dioxide gas is also generated by the breakdown and bubbles or percolates up to the surface of the water and through outlets provided in the vessel for safe release into the environment.

In its preferred form, the screened water in the vessel is introduced into a closed bio-reactor through a treatment station which may be an inert media such as a graphite filter, baked ceramic porcelains, ultraviolet treatment system or the like, for removing specific contaminants from the water. The bio-reactor tank also includes a mixture of microbes and is continually aerated to further enhance the bio-degradation of additional hydrocarbon waste contained in the water. The hydrocarbons are reduced or bio-degraded into fatty acids collecting at the bottom of the tank and carbon dioxide is percolated out of the tank and into the atmosphere. A mechanical or sump pump is utilized to discharge the water or other liquid from the bio-reactor tank and recycle it to the work station, where it reuse occurs.

In the preferred form, the vessel includes covered man-ways which permit entry into the vessel for periodic inspection and cleaning. Also, in its preferred form, up to 30% of the clean water is reintroduced in the settling stage of the system to provide a jet flow at the filtration screens for forcing particulate matter toward the bottom of the tank and into the screens.

The closed loop recycling system of the subject invention has been found to provide means for rapidly reducing organic waste in suspension in a fluid such as water and for breaking hydrocarbons down to their least hazardous components through bio-degradation, for providing a reusable water supply. The system is also very effective in providing a recycling system for treating hydrocarbons and particulate matter in solution.

It is, therefore, an object and feature of the subject invention to provide a closed loop liquid treatment system for removing particulate matter including hydrocarbons from a liquid and for breaking down the hydrocarbons into releasable gases and collectable fatty acids.

It is a further object and feature of the subject invention to provide a reclamation method from which fluids may be reused for a specific purpose in a closed loop system by consuming organic matter and/or the contaminants from suspension in the fluids.

It is yet another object and feature of the subject invention to provide a method and apparatus for removing hydrocarbon waste from fluids, generating a fluid which may be reused in a closed loop system.

Other object and features of the inventions will be readily apparent from the accompanying drawings and description.

BRIEF DESCRIPTION OF THE DRAWINGS

FIG. 3 is a schematic diagram of an alternative embodiment of the invention.

DETAILED DESCRIPTION OF THE PREFERRED EMBODIMENT

Figure 1:
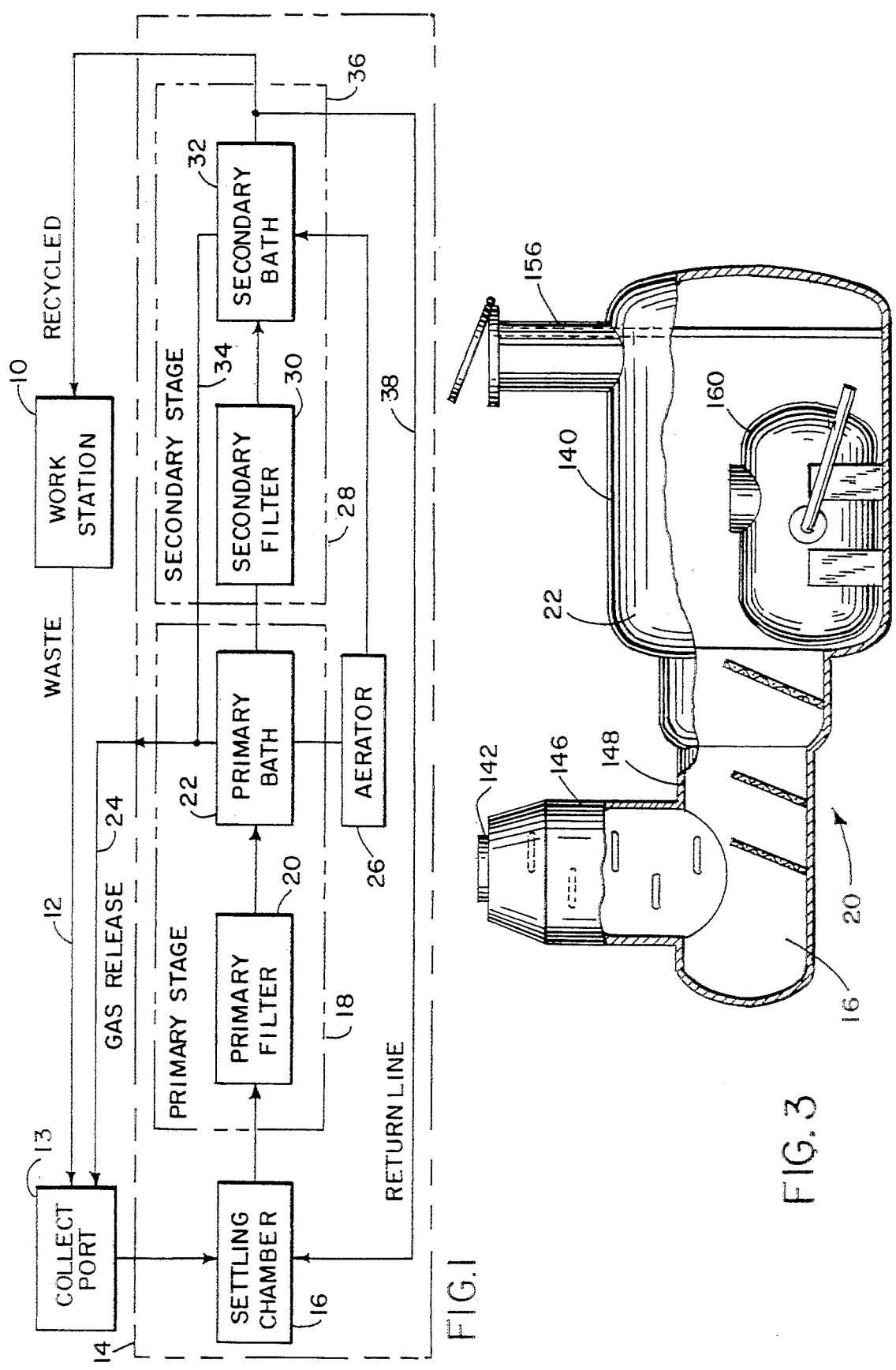
FIG. 1 is a block diagram of the method and apparatus of the preferred embodiment of the subject invention.

With specific reference to FIG. 1, a block diagram of the invention includes a work station 10 such as a designated Chemical Mixing Facility (CMF) wherein work requiring a specific effluent is performed. By way of example, the work station may comprise a cleansing chamber where maintenance equipment is routinely washed with a high pressure water spray to remove plant debris, residue, chemical waste and other contaminants. The water used at the work station is collected and discharged via a conduit or the like 12 through a collection port 13 flow via gravity into a closed treatment system 14.

In the preferred embodiment, the collection port may be a floor drain provided in the work station through which effluent precipitates into the closed system 14. The closed system includes a plurality of simultaneously operative stages, the first comprising a settling chamber 16 wherein the effluent or contaminated liquid is introduced. The primary stage 18 of the treatment system includes a primary or first filter system, typically a passive filter, as shown at 20. The passive filter 20 removes a large portion of the particulate contaminant contained in the liquid and permits them to precipitate out in the settling chamber 16. The passively screened liquid discharge through the primary filter 20 is subjected to a primary bath as designated at 22. The primary bath comprises a supply of enzymatic active hydrocarbon consuming naturally occurring single cell organisms or isolated microbes such as, by way of example, Envo Formula available from Monitor Corporation, Houston, Tex. The microbes are packaged in an inert preparation of natural clay in the form of a hydroscopic powder. In a typical solution for the active system, the hydroscopic powder comprised of an approximately five pound charge in a 3,000 gallon system. The microbes are activated by moisture to breakdown the hydrocarbon contaminants suspended in the liquid into fatty acids and carbon dioxide. The fatty acids precipitate throughout the passive filtration system for later removal and carbon dioxides are released through an outlet 24 to the atmosphere. Typically, the carbon dioxide will be released through the floor drain or collection port 13, as shown. In the aerobic configuration, an aerator 26 is provided and is in communication with the active mixture in the primary stage which provides oxygen for increasing the rate of bio-degradation. When a heavy concentration of particulate contaminants are suspended in the water, an agitation paddle or mixer may be included in the settling chamber to increase the agitation of the effluent.

In the preferred embodiment, the closed loop treatment system 14 includes a secondary stage 28 from which the fluids or liquid treated in the primary stage is re-introduced. The secondary stage contains a treatment station as designated by the secondary filter 30. The treatment station is adapted for treating the water released from the primary stage which removes specific particulate matter. For example, the secondary filter may include an ultra violet light system for removing certain bacteria and/or may include a graphite filter or other media for removing specific contaminants. The filtered fluids also are subjected to a secondary bath 32 which typically includes microbe mixture similar to or identical to that provided in the primary bath. This continuous removal of hydrocarbon waste by degradation and transformation into fatty acids which are collected as sludge at the bottom of the system and carbon dioxides which are released unobstructed from the secondary stage through a gas outlet 34. The gas outlet 34 is in communication with the inlet port 24 of the primary stage. The aerator is utilized to oxygenate the microbal mixture in the entire system, with aerator 26 being located within the bio-reactor tank. The cleansed liquid is then passed from the secondary stage via sump pump line 36 where it is recycled and reintroduced into the work station 10.

In order to promote proper settling of the contaminant in the waste water introduced into the system at chamber 16, a return line 38 may provide for reintroduction of a portion of the cleansed water back into the settling chamber. The return line is generally used to provide a jet flow for directing the incoming contaminated fluids toward the primary filter 20 and down toward the bottom of the settling chamber to assure that the contaminants are settled out rather than passed over the primary filter 20. In the preferred embodiment, the discharge line 36 is provided with a pump for providing a pressurized flow in the return line and in the recycle vessel for reintroducing water to the work station, as well as the primary bath.

Figure 2:
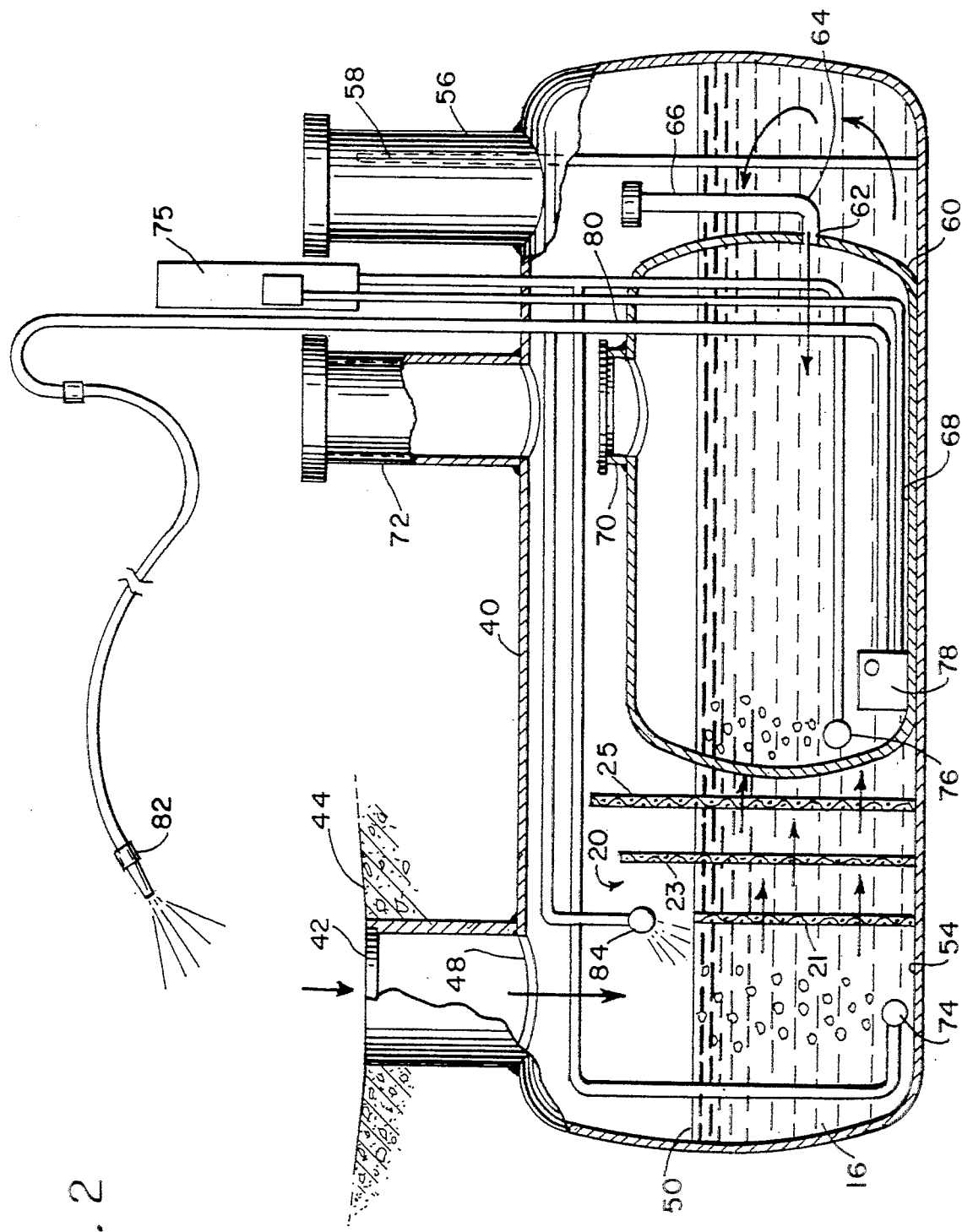
FIG. 2 is a schematic diagram of an underground system incorporating the preferred embodiment of the invention.

A first embodiment of the treatment system of the subject invention, adapted for underground installation, is shown in FIG. 2. As there shown, the closed tank 40 comprises a typical underground storage container made of an inert material such as, by way of example, fiberglass, polyethylene or stainless steel, depending upon the liquid to be treated and the contaminants contained in the waste matter. A drain 42 is provided in the floor 44 of a typical work station and is connected by man-way 46 or the like to the inlet port 48 of the vessel 40. The contaminated waste water or other liquid introduced through the drain 42 enters the vessel 40 in the settlement chamber area 16 where the water is then gravity fed through a passive filter system 20. In the preferred embodiment the filter system 20 comprises a plurality of mechanical screens or other media filters. Typically, the screens have decreasing openings where each stage of the screen removes smaller particulate contaminants contained within the water.

The Envo Formula is introduced into the vessel primary bath and provides a solution or mixture to the incoming waste water collection port of approximately 1 trillion isolates per gram. When the vessel 40 is filled to its typical fill line 50 at or just below the uppermost edge 52 of the first screen 21 in the filter series 20, eighty grams of isolates are required to provide the primary charge. Line 50 is approximately 65% of tank capacity, or what is defined as the operational level of the 3,000 gallon example. When the 3,000 gallon container is properly filled, 80 grams of Envo Formula are required to charge the system. In typical operation, two grams of Envo Formula are added each week to maintain the charge. The microbes break down the hydrocarbons while in the suspended contaminated liquid staging into fatty acids which are collected on the tank bottom 54 and carbon dioxides which are released through the gas outlet typically floor drain 42. The preferred embodiment also includes a man-way 56 permitting routine inspection of the vessel and permitting entry via a ladder 58 reaching to the floor of the primary container to a flow for inspection and for removal of sludge collected at the bottom 54 of the tank.

The liquid in the vessel is introduced into a closed bio-reactor tank 60 via an inlet port 62, secondary stage of the system. The bio-reactor tank 60 defines the third stage of the system depicted in FIG. 1. In the preferred embodiment, a treatment station 64 is positioned in advance of the inlet port 62 and includes a perforated conduit 66 which is filled with graphite or other media to remove specific contaminants from the liquid. The liquid is introduced into the vessel 60 where it is further subjected to a microbe mixture for breaking down remaining hydrocarbons into fatty acids collected at the bottom 68 of the tank 60 and carbon dioxide which may be released via a gas outlet 70 and into the main vessel 40, through which the gas is released via the main floor drain 42. An inspection man-way 72 may be provided for gaining entry into the tank 60. The man-way 72 is positioned in the main vessel 40 above the gas outlet 70 of the tank 60.

In the aerobic system, aerators are provided in both the main vessel 40, as shown at 74 and the tank 60, as shown at 76, providing adequate oxidation to promote the action by the microbes on the hydrocarbon wastes.

In the preferred embodiment a ⅓ horsepower sump pump 78 is provided in the tank 60. The pump may be located anywhere within the tank as long as it is above the sludge collecting level 68. The pump 78 is used to pump the tertiary treated cleansed liquids from the tank 60 into the discharge conduit 80. The discharge conduit 80 is in communication with an outlet 82, such as a high pressure hose and nozzle system in the work station, through which the treated liquid may be released for reuse.

In the preferred embodiment, the screen 20 includes a series of filtration screens 21, 23 and 25. Each screen has a grid and height configuration designed to entrap specific contaminants, depending upon the conditions being treated. It will readily be understood by those skilled in the art that the passive filtration system 20 is dependent upon the specific condition of the effluent and contaminants in the closed system.

The liquid pumped from the tank 60 is reintroduced into the settling chamber area 16 in advance of the filters screens 21, 23, 25 in the form of water jets, as shown at 84° Whenever the system is operable, this occurs, defining an aquative mode. When the water is selectively cycled to the work station, a portion of the flow continues through jets 84. This assures that the floating contaminants in the water are urged downwardly into the filter system 20 and toward the bottom of the chamber, assuring that the contaminants do not flow unobstructed through the screen 25 and are restricted in the first stage of the system.

A control system 75 is positioned in the work station and is operative in typical fashion to control the aerator 74, 76 and the pump 78. The control system may also be adapted to monitor system fluid levels during each stage.

In a typical system, the primary vessel 40 has a 3,000 gallon capacity with a 1,000 gallon bio-reactor tank 60 therein. The fill line 50 is approximately 65% capacity, with an operational level using zone of 50-75% capacity being acceptable in normal conditions, ideally about 1,700 gallons of fluids. The system requires a primary charge of 80 grams of Envo Formula and is capable of recycling approximately 160,000 gallons of water per day in a closed CMF recycling unit. Approximately 80% of the recycled water can be discharged through the nozzle 80 (or about 125,000-130,000 gallons) with the remaining 20% being utilized to provide water jets 84. In the preferred embodiment up to 120 gallons per minute can be delivered to the CMF. It will be understood that the efficiency of the systems bioremediation is a factor of contact between the suspended contaminants and the active microbes.

An alternative embodiment of the system of the subject invention is shown in FIG. 3. The alternative embodiment operates in the same manner as the system described in FIG. 1 and illustrated in FIG. 2, but shows separation of the filter system 20 from the primary bath area 22 and the secondary bio-reactor tank 60. In the embodiment of FIG. 2, the floor drain 142 (or collection port in an above ground system) is in communication via conduit 146 with a settling chamber 16 and a filter system 20 which is an extension 148 of the main vessel 40. The filter screens 20 of the embodiment of FIG. 3 are in advance of the primary bath area 22 within the vessel 40. As the fluid is passed with the water or other liquid and released through the screens 20, it is introduced into the bath 22, wherein the microbes are concentrated to break down hydrocarbon contaminants suspended in the liquid into carbon dioxides and harmless sludge. The carbon dioxides are released freely through the riser/man-way 156. The bio-reactor tank 160 is housed within the vessel 140 and operates in the same manner as the bio-reactor tank 160 illustrated in FIG. 2.

Basically, the operation of the system shown in FIG. 3 is identical to that shown in FIG. 2. It will be recognized that the various components of the closed loop system, as diagrammatically illustrated in FIG. 1, may be self-contained as shown in FIG. 2, may be interconnected as shown in FIG. 3 or may be independent units connected by conduits or the like with various pumps where required to manipulate the liquid from station to station. Within the spirit of the invention, it is only required that the treatment be done in a closed loop system, permitting recycling of the liquid to a work station after treatment, then to be recaptured. Also, it will be understood that additional stages could be added to further enhance the cleansing process, as dictated by specific applications.

While certain features and embodiments of the invention have been disclosed in detail herein, it will be understood that the invention encompasses all modifications and enhancements within the scope and spirit of the following claims.

What is claimed is:

1. A closed loop liquid treatment system for removing particulate matter from a liquid and for breaking down hydrocarbons suspended in the liquid into releasable gases and collectable fatty acids, comprising:
   a. a closed container having a container inlet port for receiving liquid contaminated with suspended particulate matter and/or hydrocarbons;
   b. a passive filter in communication with the inlet port for capturing particulate matter suspended in the liquid;
   c. a container mixture of active hydrocarbon consuming naturally occurring single cell organisms in the container for breaking down the hydrocarbons suspended in the liquid into collectable sludge and releasable gases;
   d. a closed tank assembly having:
      i. a tank inlet port for receiving filtered liquid from the closed container;
      ii. a treatment station in communication with the tank inlet port, wherein the treatment station comprises a graphite filled perforated conduit for treating the filtered liquid entering the closed tank from the closed container by removing predefined contaminants; and
      iii. a tank mixture of active, hydrocarbon consuming, naturally occurring single cell organisms in the tank for further breaking down the hydrocarbons suspended in the liquid into collectable sludge and releasable gases; and
   e. a discharge system in communication with the closed tank for discharging the treated liquid for recycling.

2. The closed loop liquid treatment system of claim 1, further including an aerator in the container for supplying oxygen to the liquid therein for supporting the oxygenation of the container mixture.

3. The closed loop liquid treatment system of claim 1, further including an aerator in the closed tank for supplying oxygen to the liquid therein for supporting the oxygenation of the tank mixture.

4. The closed loop liquid treatment system of claim 1, further including an agitator for mixing the liquid in advance of the passive filter.

5. The closed loop liquid treatment system of claim 1, wherein the passive filter system is positioned within the closed container.

6. The closed loop liquid treatment system of claim 1, further comprising a feedback loop for reintroducing treated liquid into the container in parallel with the inlet port.

7. The closed loop liquid treatment system of claim 1, wherein the passive filter comprises a plurality of screen baffles placed in series with one another intermediately of the inlet port and the closed tank.

8. The closed loop liquid treatment system of claim 1, further including a first gas outlet in the closed tank and in parallel with the liquid outlet port for releasing the releasable gases from the closed tank.

9. The closed loop liquid treatment system of claim 8, further including a second gas outlet in communication with the container and in advance of the tank for releasing the releasable gases from the container.

10. The closed loop liquid treatment system of claim 9, wherein the first gas outlet is adapted for releasing the releasable gases in the closed tank back into the container.

11. The closed loop liquid treatment system of claim 8, wherein the first gas outlet further defines an access port to the interior of the container for removing sludge therefrom.

12. The closed loop liquid treatment system of claim 1, wherein the container mixture is further a hydroscopic powder.

13. The closed loop liquid treatment system of claim 12, wherein the hygroscopic powder is dispersed in the liquid in a concentration of 1 trillion microbes per gram.

14. The closed loop liquid treatment system of claim 1, the discharge system further including a pump in communication with the liquid outlet port for releasing the liquid therethrough under pressure.

15. A closed loop water treatment system for removing particulate matter including hydrocarbons from the water and for breaking down the hydrocarbons into releasable gases and collectable fatty acids, comprising:
   a. a closed vessel having primary inlet port for receiving liquid contaminated with suspended particulate matter and/or hydrocarbons;
   b. a closed bio-reactor tank within the closed vessel and having a secondary inlet port for receiving water from the closed vessel;
   c. a treatment station in advance of the tank inlet port, wherein the treatment station comprises a graphite filled perforated conduit for treating the filtered liquid entering the closed tank from the closed container by removing predefined contaminants;
   d. a water outlet port in communication with the closed bio-reactor tank for releasing treated water;
   e. a passive filter in the vessel for restricting particulate matter suspended in the water before the water is introduced into the bio-reactor tank;
   f. a mixture of active hydrocarbon consuming naturally occurring single cell organisms in the vessel and the bio-reactor tank for breaking down the hydrocarbons in the water into collectable sludge and releasable gases;
   g. an aerator in the vessel and the bio-reactor tank for supplying oxygen to the liquid therein for supporting the oxygenation of the single cell organisms; and h. a discharge system for releasing the treated liquid through the water outlet port for recycling.

16. The closed loop water treatment system of claim 15, further comprising a feedback loop for reintroducing treated liquid into the vessel from the bio-reactor tank.

17. The closed loop water treatment system of claim 15, further including a gas outlet in communication with the vessel and in advance of the bio-reactor tank for releasing the releasable gases from the vessel.

18. The closed loop water treatment system of claim 17, further including a bio-reactor tank gas outlet port adapted for releasing the releasable gases from the bio-reactor tank.

19. The closed loop water treatment system of claim 18, wherein the gas outlet further defines an access port to the interior of the vessel for removing sludge therefrom.

* * * * *